Aug. 25, 1931.   L. C. SHIPPY   1,820,252
ELECTRIC CONTROL
Filed April 3, 1929   8 Sheets-Sheet 1

Inventor
Leo C. Shippy.
By Spencer, Hardman, & Fehr
his Attorneys

Aug. 25, 1931.  L. C. SHIPPY  1,820,252
ELECTRIC CONTROL
Filed April 3, 1929   8 Sheets-Sheet 2
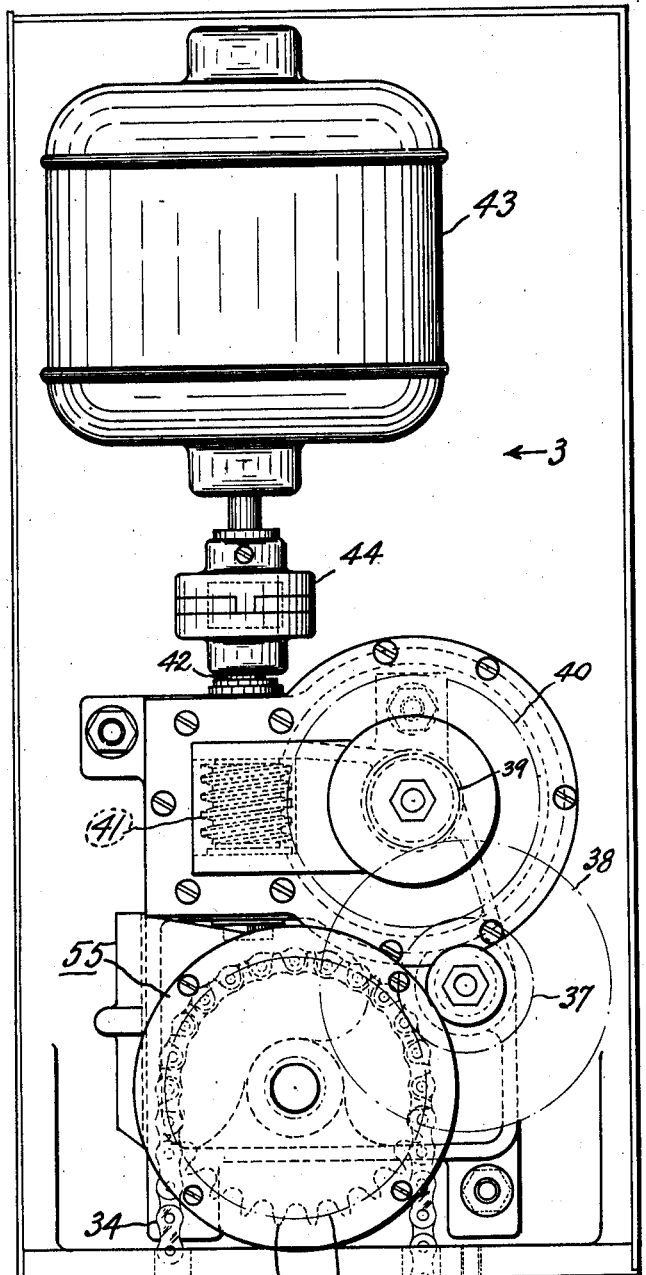
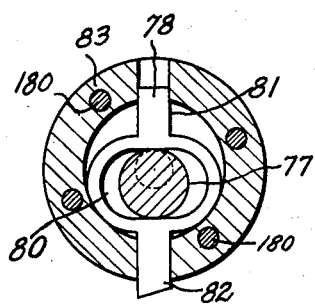
Fig. 17
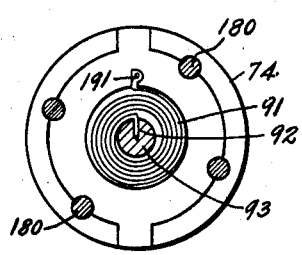
Fig. 18
Fig. 2a
Inventor
Leo C. Shippy
By Spencer, Hardman and Fehr
his Attorneys

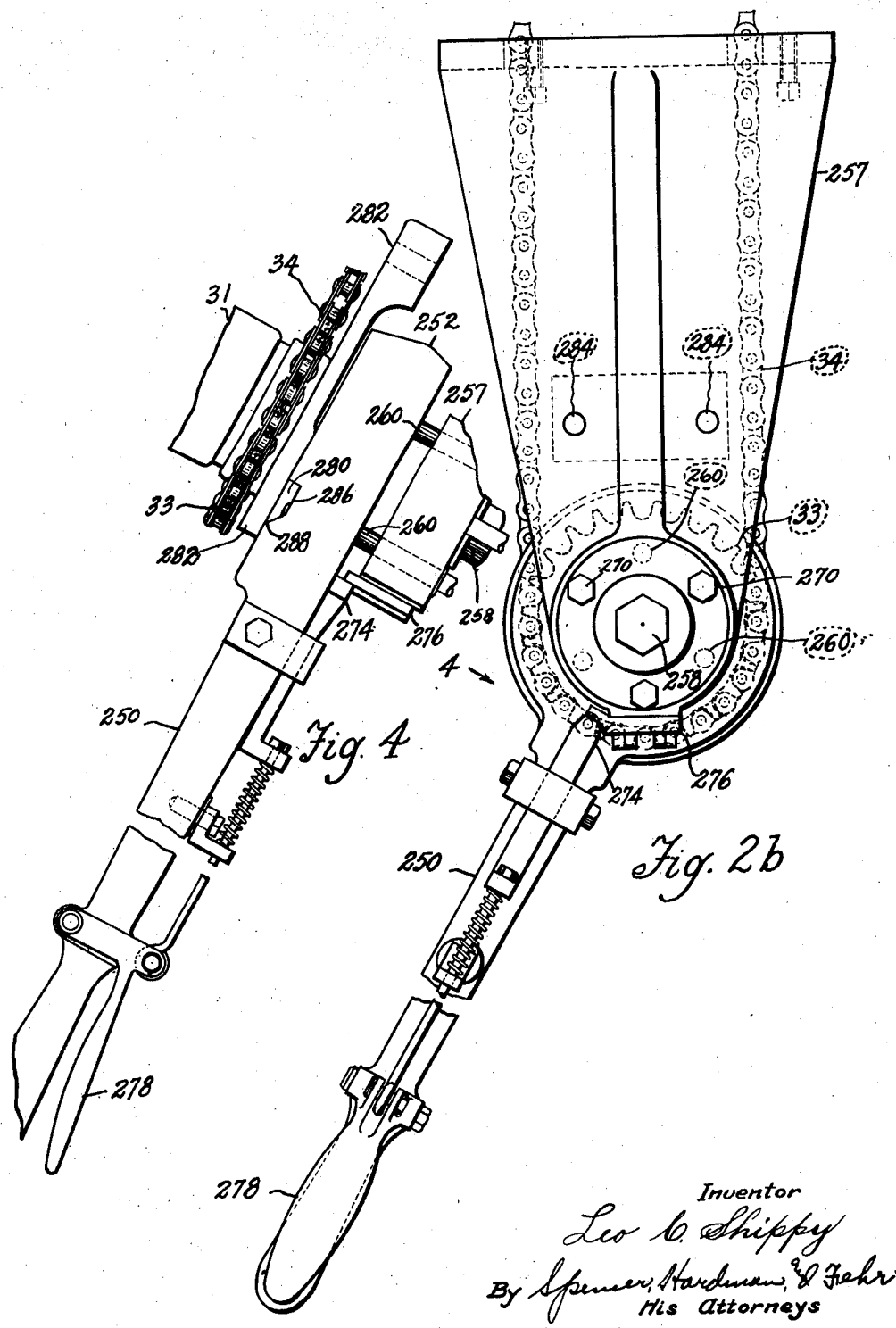

Aug. 25, 1931.   L. C. SHIPPY   1,820,252
ELECTRIC CONTROL
Filed April 3, 1929   8 Sheets-Sheet 4
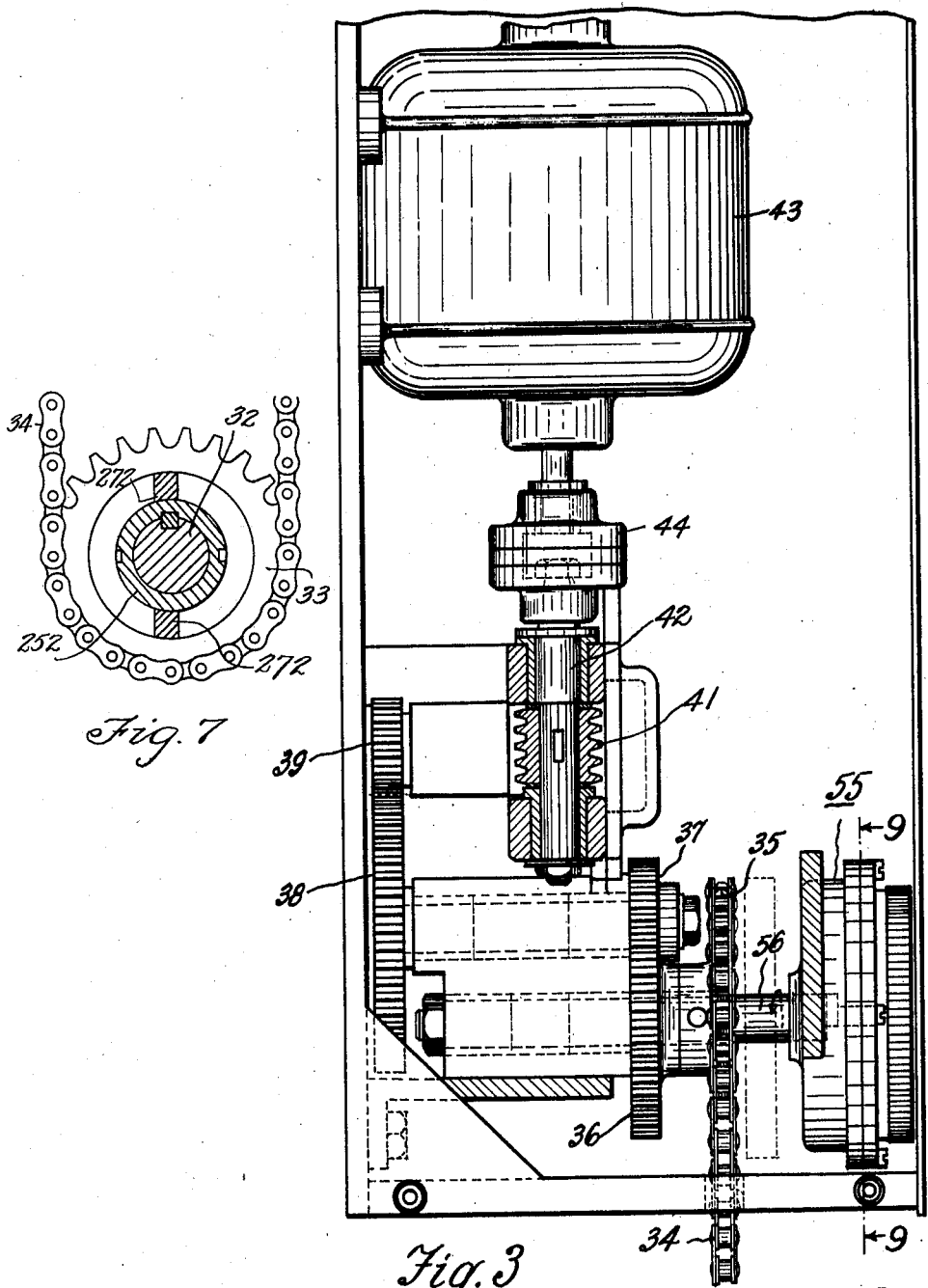

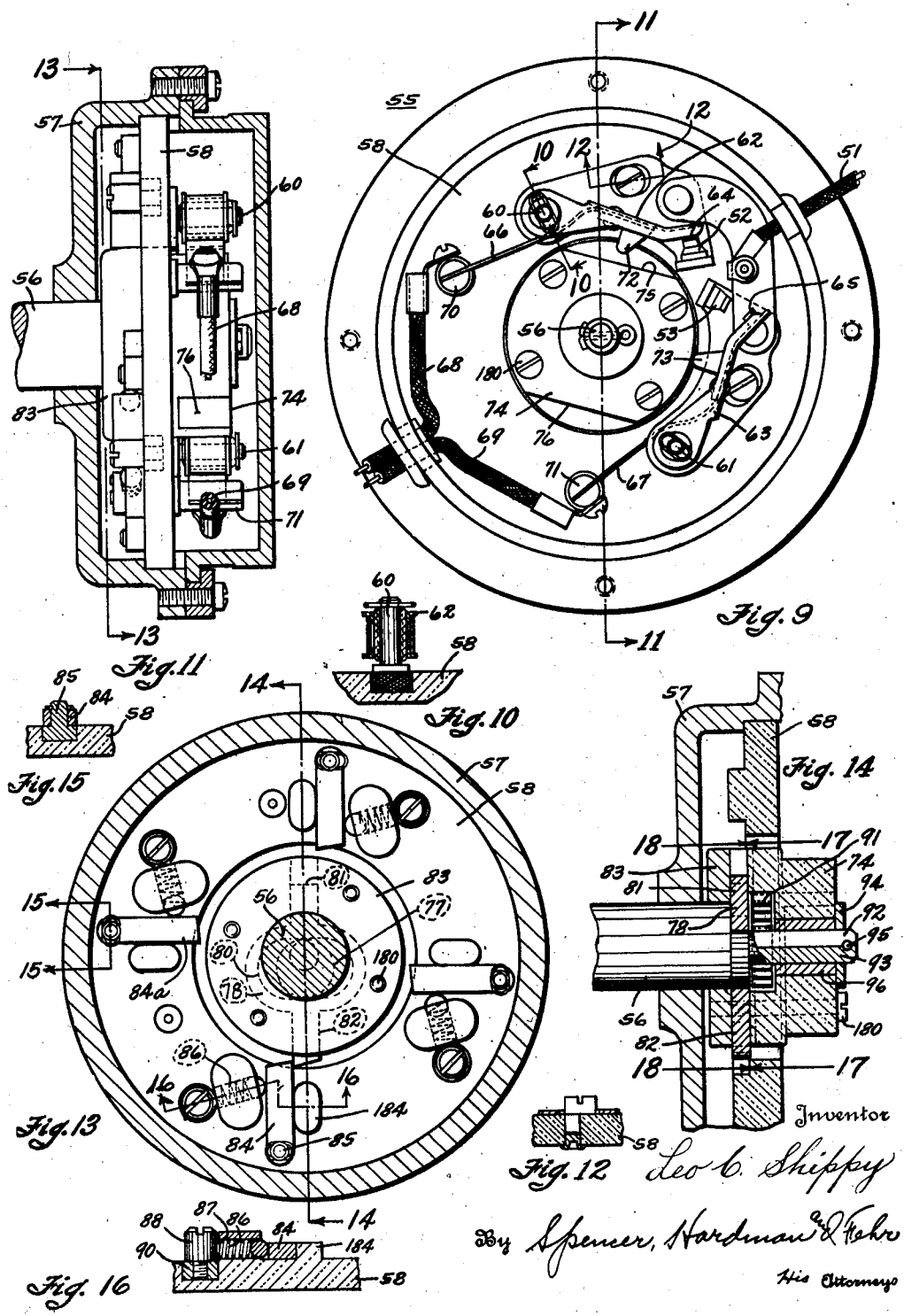

Aug. 25, 1931.  L. C. SHIPPY  1,820,252
ELECTRIC CONTROL
Filed April 3, 1929  8 Sheets-Sheet 7

Inventor
Leo C. Shippy
By Spencer, Hardman, & Fiehr
His Attorneys

Aug. 25, 1931.   L. C. SHIPPY   1,820,252
ELECTRIC CONTROL
Filed April 3, 1929    8 Sheets-Sheet 8

Inventor
Leo C. Shippy
By Spencer, Hardman, & Fehr
His Attorneys

Patented Aug. 25, 1931

1,820,252

UNITED STATES PATENT OFFICE

LEO C. SHIPPY, OF ANDERSON, INDIANA, ASSIGNOR TO DELCO-REMY CORPORATION, OF ANDERSON, INDIANA, A CORPORATION OF DELAWARE

ELECTRIC CONTROL

Application filed April 3, 1929. Serial No. 352,310.

This invention relates to a device for controlling the pressure applied to a hydraulic press and in particular to a device for automatically controlling the pressure by an electrically controlled mechanism.

An object of this invention is to provide a rotary valve which, when rotated through a predetermined angle automatically connects the cylinder of a hydraulic press to a pressure different from the pressure applied immediately before the rotation of the valve.

Another object of this invention is to provide a driving means for the valve. This is accomplished by providing an electric motor connected to the valve by means of a suitable speed reducing mechanism.

Another object of this invention is to provide means for closing the circuit through this motor after a certain pressure has been applied to the cylinder of the hydraulic press for a predetermined length of time.

Another object of this invention is to provide means for automatically opening the motor circuit when the valve has been rotated exactly through the angle required to change the pressure in the cylinder of the hydraulic press.

Another object of this invention is to provide a control for the motor rotating the valve which is durable, dependable, easily constructed and accurate. This is accomplished by providing a plurality of pilot circuits, each of which is automatically closed and opened in sequence by a timing mechanism so as to intermittently energize the motor circuit.

Another object of this invention is to provide dependable switching means in the pilot circuits. This is accomplished by providing contacts which are opened and closed by cam means so that when the contacts are closed the contacts do not move relative to each other.

Another object of this invention is to provide means for adjusting the relative time of application of each pressure. This is accomplished by providing an adjustment of the cams for closing and opening the pilot circuits.

Another object of this invention is to provide means for varying the total time that the pressures are applied, so as to accommodate various types of work. This is accomplished by providing means for changing the relative speed of the cams and the timing means.

Another object of this invention is to provide a system of cams which, when adjusted are relatively fixed to each other so that the time intervals for the application of each pressure to the cylinder will bear a constant ratio to each other and will be the same for successive cycles.

Further objects and advantages of the present invention will be apparent from the following description, reference being had to the accompanying drawings, wherein a preferred form of the embodiment of the present invention is clearly shown.

In the drawings:

Fig. 2a is a side elevation of the power unit.

Fig. 2b is a side view of the valve driving mechanism.

Fig. 3 is another side elevation of the power unit with parts in section as viewed in the direction of the arrow 3 in Fig. 2a.

Fig. 4 is a side view of the valve driving mechanism looking in the direction of the arrow 4 in Fig. 2b.

Fig. 7 is a sectional view taken on the line 7—7 of Fig. 5.

Fig. 9 is a sectional view taken on the line 9—9 of Fig. 3.

Fig. 10 is a fragmentary sectional view taken on the line 10—10 of Fig. 9.

Fig. 11 is a sectional view taken on the line 11—11 of Fig. 9.

Fig. 12 is a fragmentary, sectional view taken on the line 12—12 of Fig. 9.

Fig. 13 is a sectional view taken on the line 13—13 of Fig. 11.

Fig. 14 is a fragmentary, sectional view taken substantially on the line 14—14 of Fig. 13.

Fig. 15 is a fragmentary, sectional view taken on the line 15—15 of Fig. 13.

Fig. 16 is a fragmentary, sectional view taken on the line 16—16 of Fig. 13.

Fig. 17 is a sectional view taken on the line 17—17 of Fig. 14.

Fig. 18 is a sectional view taken on the line 18—18 of Fig. 14.

Figures 1, 8, 19:
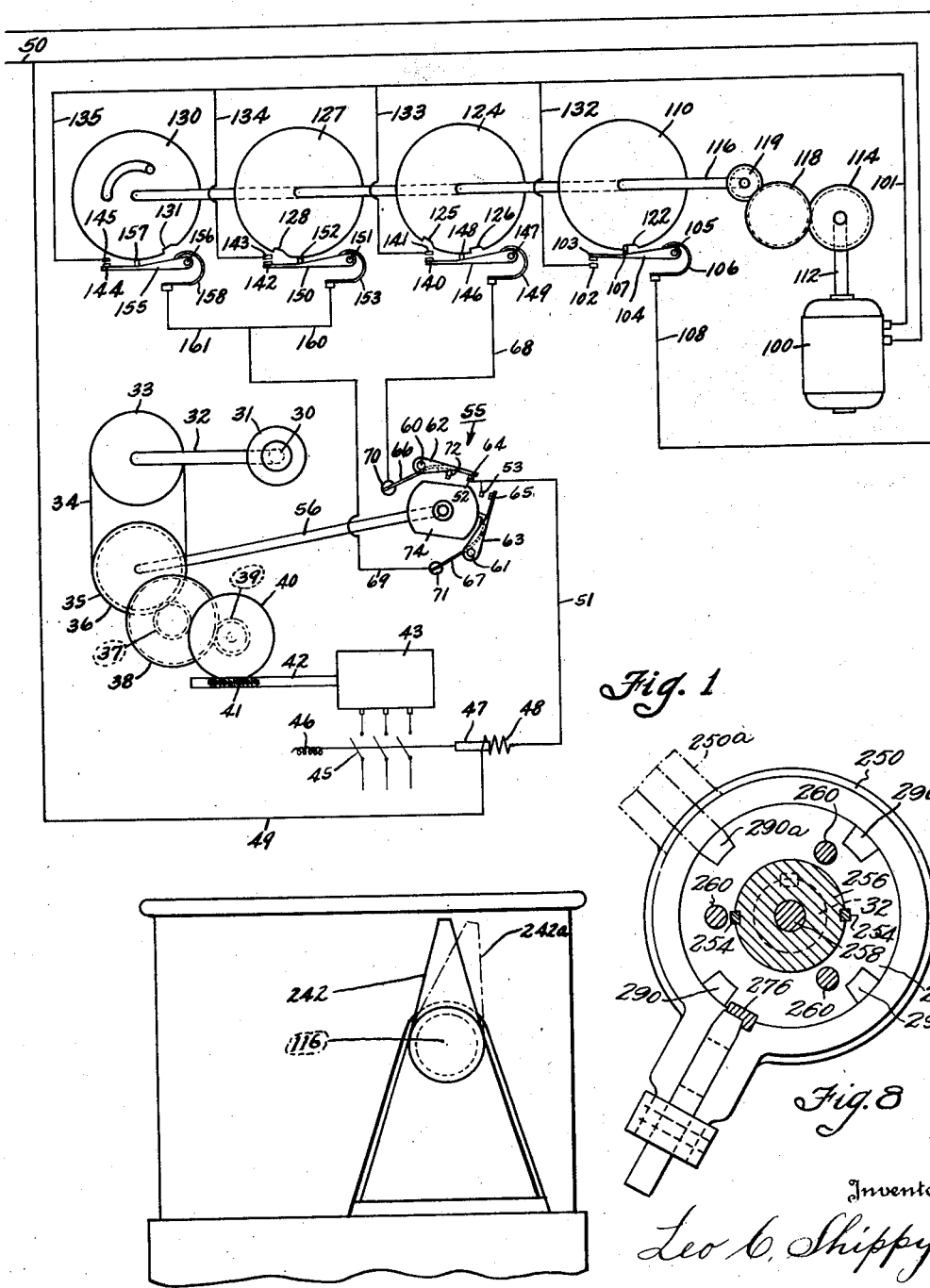
Fig. 1 is a schematic diagram of the control.
Fig. 8 is a sectional view taken on the line 8—8 of Fig. 5.
Fig. 19 is an end elevation of the timer mechanism.

In the drawings, the reference character 30 indicates a rotary valve cooperating with a valve seat member 31 in order to control the pressure applied to the cylinder of a hydraulic press. The valve 30 may have four operating positions requiring it to be turned intermittently one quarter turn. The valve upon being rotated each quarter turn from the normal position connects the cylinder in sequence first to a source of low pressure, second to a source of high pressure, third to neutral position and fourth to the exhaust. To accomplish this, the valve 30 is mounted on an operating shaft 32 carrying a sprocket wheel 33 connected by a sprocket chain 34 with a sprocket wheel 35. The wheel 35 is connected to a gear 36 driven by a gear 37 connected with a gear 38 which is driven by a gear 39 connected with a worm wheel 40 driven by a worm 41 keyed to a shaft 42 driven by an electric motor 43 through a flexible coupling 44.

The motor 43 is controlled by a switch 45 normally held in open position by a spring 46. The switch is attached to an armature 47 which is attracted into switch closing position by a magnet coil 48 connected at one end with a wire 49 leading to a 110 volt live wire 50. The other end of the magnet 48 is connected by a wire 51 with a pair of stationary contacts 52 and 53.

A switch 55 for connecting the common lead 51 either to lead 68 or lead 69 is mounted on the end of shaft 56 fixedly attached to the sprocket wheel 35 and the gear 36 as best seen in Figs. 9, 11, 13 and 14. The switch 55 includes a stationary member 57 having mounted therein a switch supporting disc 58 preferably made of bakelite or some other suitable insulating material. A pair of pins 60 and 61 has been molded into the bakelite disc 58 and supports, but insulated therefrom, pivotally mounted contact levers 62 and 63 carrying the contact points 64 and 65 respectively. The contact levers 62 and 63 are biased into a closed position by the conducting leaf springs 66 and 67 respectively. The leaf springs are attached to the pins 70 and 71 molded into disc 58 and riveted to the pivoted levers 62 and 63 respectively. The pivotally mounted levers 62 and 63 have riveted thereto cam following members 72 and 73, respectively, which cooperate with a cam 74 made from insulating material such as bakelite. The cam 74 is connected to the shaft 56, details of which will be described later. The cam 74 has two flat sides 75 and 76 which permit the cam followers 72 and 73 to advance inwardly toward the center of the shaft so as to close the pairs of contact 52 and 64 or 53 and 65. As the two flat surfaces are diametrically opposite each other and as the cam followers 72 and 73 are spaced in quadrature it can be readily seen that when one pair of contacts will open the other will close and vice versa.

The shaft 56 terminates in an eccentric cam portion 77 which has mounted thereon a reciprocating latch 78 provided with an elongated opening 80 permitting the cam 77 to rotate moving the latch 78 upwardly and downwardly as viewed in Fig. 17. The latch 78 is provided with a pair of arms or detents 81 and 82 extending into a recessed annulus 83 which is attached to the cam 74 by means of screws 180 so that as annulus 83 rotates, the cam 74 will rotate therewith. When the shaft 56 is in the position disclosed in Figs. 13 and 17, the detent 82 will engage the stop 84 pivotally mounted at 85 on a pivot which has been molded in the bakelite 58. The stop 84 is limited in its movement in a clockwise direction as seen in Fig. 13 by a projection 184 integral with the bakelite supporting member 58. Stop 84 is permitted to rotate in a counterclockwise direction as viewed in Fig. 13 a limited distance against the force of a helical spring 86 mounted in aperture 87 and held in position by a screw 88 threadedly engaging a nut 90 molded in the bakelite 58.

One end of a spiral spring 91 is located in a slot 92 extending longitudinally in a reduced portion 93 of the shaft 56. The other end of the spring 91 is located in a recess 191 in cam 74. In Fig. 14 it may best be seen that members 83, 78, 74 and the spring 91 are retained on the reduced portion 93 by a washer 94 and a pin 95. Intermediate the washer 94 and the elongated portion 93 of the shaft 56 is mounted a bearing 96. As the shaft 56 rotates through an angle less than 90°, the cam 77 will retract the detent 82 thereby permitting the cam 74 to snap through an angle of 90°, that is, as soon as detent 82 is released by the stop 84. The spring 91 which has been previously wound will rotate the cam 74. Now as the cam 74 rotates through 90°, the cam 77 will actuate the latch 78 so that it will engage the succeeding stop 84a. As these stops are resiliently mounted the concussion caused by the two members striking each other is reduced. As the cam 74 is rotated through 90°, as may best be seen in Fig. 1 the contacts 53 and 65 will be closed and that contacts 52 and 64 will be opened.

The 110 volt live wire 50 leads to a small synchronous motor clockwork 100 connected with wires 101 and 132 leading to a switch provided by contacts 102 and 103. Contact 103 is attached to a conducting lever 104 pivoted at 105 and urged by a spring 106 into switch open position. The lever 104 carries a cam follower 107 which cooperates with a disc 110 in a manner to be described later. The lever 104 is connected to the spring 106 with the 110 volt live wire 108. The motor 100 drives a shaft 112, carrying a gear 114 which drives a shaft 116 through a train of gears 118 and 119. The disc 110 is integral to the shaft 116 and is provided with a notch 122 for receiving the cam follower 107. The shaft 116 drives a disc 124 having notches 125 and 126, a disc 127 having a notch 128 and a disc 130 having a notch 131. The wire 101 is connected by wires 132, 133, 134, 135 respectively with pairs of switch contacts 102, 103; 140, 141; 142, 143; and 144, 145. The contact 140 is carried by a conducting lever 146 pivoted at 147 and carrying a cam follower 148 urged by a conducting spring 149 against the periphery of the disc 124. The contact 142 is carried by a conducting lever 150 pivoted at 151 and carrying a cam follower 152 urged by a conducting spring 153 against the periphery of the disc 127. The contact 144 is carried by conducting lever 155 pivoted at 156 and carrying a cam follower 157 which is urged by a conducting spring 158 against the periphery of the disc 130. Wires 160 and 161 connect the levers 150 and 155 with the switch contact 65. Wire 68 connects the lever 146 with the switch contact 64. The operation of the automatic controller is as follows:

The drawings show the apparatus in normal position between each operation. It will be noted that the switches controlling the motors 100 and 43 are open. In order to initiate cycle of movement of the rotary valve 30, the motor 100 must be started. This is accomplished by turning the disc 110 in a clockwise direction as viewed in Fig. 1, details of which will appear more fully later so that the notch 122 can be moved away from the cam follower 107 in order to close the switch contacts 102 and 103. Then the motor 100 will drive the shaft 116 through the train of gearing so that the shaft 116 will turn very slowly, the shaft completing one revolution for every cycle of movements of the valve 30. After a slight rotation of the shaft 116 has taken place, the notch 126 will be moved into radial alignment with the cam follower 148 in order to permit the spring 149 to close the switch contacts 140 and 141. When this occurs, the magnet 48 will be energized through the circuit wire 49, magnet coil 48, wire 51, contacts 52 and 64, lever 62, leaf spring 66, wire 68, spring 149, lever 146, contacts 140 and 141, wires 133 and 132, contacts 102 and 103, lever 104, spring 106 and wire 108. Then the main switch 45 will be closed and the valve actuating motor 43 will turn shaft 32 in a counterclockwise direction, as viewed in Fig. 2b, through the first quadrant so as to rotate the valve 30 through 90° thereby causing the valve 30 to connect the cylinder 226 with a source of low pressure indicated by the reference character 225. As shaft 36 rotates through an angle slightly less than 90°, the cam 77 will retract the detent 82 thereby permitting the cam 74 to snap through an angle of 90°. As cam 74 is rotated through an angle of 90° contacts 53 and 65 will be closed and contacts 52 and 64 will be opened. When this occurs, the magnet 48 is deenergized causing the spring 46 to open switch 45.

The motor 100 will continue to rotate until the notch 131 of the disc 130 has been moved into radial alignment with the cam follower 157 in order to permit the closing of the switch contacts 144 and 145. When this occurs, the magnet 48 will be energized into the following circuits: Wires 50 and 49, coil 48, wire 51, contacts 53 and 65, lever 63, spring 67, pivot 71, wires 69 and 161, spring 158, lever 155, contacts 144 and 145, wires 135 and 132, contacts 103 and 102, lever 104, spring 106 and wire 108. Then the switch 45 will be closed and the motor 43 will rotate the shafts 62 and 32 through the second quadrant so as to rotate the valve 30 through 90°, thereby changing the source of pressure applied to the cylinder 226 from the low pressure source 225 to the high pressure source 228 and as shaft 36 rotates through an angle slightly less than 90°, the cam 77 will retract the detent 82, thereby permitting the cam 74 to snap through another angle of 90°. As cam 74 is rotated through an angle of 90°, contacts 52 and 64 will be closed and contacts 53 and 65 will be opened. When this occurs, the magnet 48 is de-energized causing the spring 46 to open switch 45.

The motor 100 continues to rotate until the notch 125 of the disc 124 is moved into radial alignment with the cam follower 148 in order to permit the closing of the switch contacts 140 and 141. When this occurs, the magnet coil 48 will be energized by the following circuits: Wires 50 and 49, coil 48, wire 51, contacts 52 and 64, lever 62, spring 66, pivot 70, wire 68, spring 149, lever 146, contacts 140 and 141, wires 133 and 132, contacts 102 and 103, lever 104, spring 106 and wire 108. When this occurs, magnet coil 48 will be energized again, the switch 45 will be closed, and the motor 43 will rotate the shafts 56 and 32 through the third quarter turn thereby to disconnect the cylinder from the high pressure 228 to neutral, and to permit the cam 74 to snap through an angle of 90°. As cam 74 is rotated through an angle of 90°, contacts 53 and 65 will be closed and contacts 52 and 64 will be opened. When this occurs, the magnet 48 is de-energized and the spring 46 opens the motor switch 45.

The motor 100 will continue to rotate until the notch 128 of the disc 127 has been moved sufficiently to permit the cam follower 152 to move into notch 128 to permit closing of the contacts 142 and 143. When this occurs, the magnet coil 48 will be energized by the following circuits: Wires 50 and 49, magnet coil 48, wire 51, contacts 53 and 65, lever 63, leaf spring 67, pivot 71, wires 69 and 160, spring 153, lever 150, contacts 142 and 143, wires 134 and 132, contacts 102 and 103, lever 104, spring 106 and wire 108. When this occurs, magnet coil 48 will be energized again, the switch 45 will be closed, and the motor 43 will rotate the shafts 56 and 32 and the valve 30 through the fourth quarter turn, thereby to permit the cylinder 226 to be connected to the exhaust 224 and permitting the cam 74 to snap through an angle of 90°. As cam 74 is rotated through an angle of 90°, contacts 52 and 64 will be closed and contacts 53 and 65 will be opened. When this occurs, the magnet 48 is de-energized and the spring 46 opens the motor switch 45. When the cylinder is connected to exhaust the press will open slowly to the open position so as to permit the removal of the work and to permit the insertion of a new piece of work.

The motor 100 will now operate for a brief period sufficiently to bring the notch 122 of the disc 110 into radial alignment with the cam follower 107 to permit opening of the contacts 102 and 103. Then the motor 100 will stop as the circuit through the motor will be opened. The cycle of operation of the switches controlled by the motor 100 is now completed and will not be repeated until the operator turns the disc 110 sufficiently to close the contacts 102 and 103 again.

All types of work do not require the application of each pressure the same length of time. In order to change the total length of time to carry out the operations, gear 119 is removably mounted so that another gear of a different size may be substituted therefor so as to change the relative speed between the shaft 116 and the motor 100. Gear 119 is provided with an aperture which cooperates with a pin 200 carried by the collar 202 keyed to the shaft 116. Gear 119 is held in position by a leaf spring 204 attached to the upright bracket 206 by a suitable screw. In order to accommodate gears of various sizes it is necessary to provide means whereby the gear 118 may be moved away from or towards the gear 119. This has been accomplished by mounting gear 118 on a stub shaft 208 which is attached to member 210 pivotally mounted for rotation on member 212 and held in the adjusted position by means of screws 214 and 216. The head of screw 214 is provided with a recess 218 into which fits member 210. A clamp 220 cooperates with bracket 206 and the screw 216 in holding member 210 in position.

Figure 26:
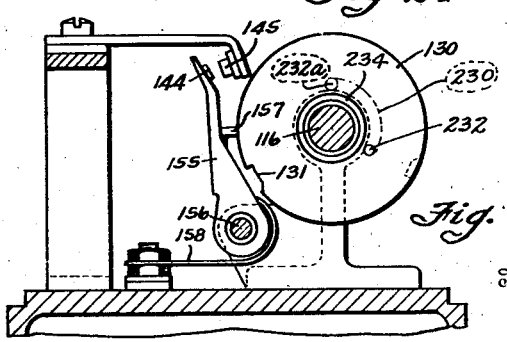
Fig. 26 is a sectional view taken on the line 26—26 of Fig. 21.

In order to adjust the relative ratio of the length of time that the low pressure and the high pressure is applied to the cylinder of the hydraulic press, the cam 130 may be adjusted. This has been accomplished by providing a slot 230 in the mounting integral with cams 110, 124 and 127. Cam 130 is provided with a pin 232 secured thereto and extending into the slot 230. The cam 130 is rotatably mounted on the shaft 116 and is held in frictional engagement with the mounting of the other cams 110, 124 and 127 by a spring 234 mounted intermediate the cam 130 and a collar 236 fixedly attached to the shaft 116. The spring 234 will cause the cam 130 to rotate with cams 110, 124 and 127. The pin 232 and slot 230 permits the operator to rotate the cam 130 through substantially an angle of 120° so that the pin 232 may be located any place between the full line position 232 to the dot dash position 232a as best seen in Fig. 26. As this cam is moved in a counterclockwise direction as viewed in Fig. 1 on the shaft 116 more time will be allowed for the low pressure and less time for the high pressure. After the relative length of time required for the low pressure and for the high pressure has been determined, the operator may position the cam 130 so that the ratio of the time for the low pressure to that for the high pressure agrees with this ratio. By selecting the proper size gear 119 the desired time of application of both the low pressure and the high pressure is attained.

Formerly in electrically controlled devices one of the cams has been loosely mounted on the shaft to permit a slight rotation of this cam without rotating the shaft so that the rotation of the one cam which closes the initial circuit will not rotate the shaft of the timer. In this device the cam 110 which corresponds to the loosely mounted cam on the former devices is integral with the shaft, the operator in starting the machine turns the knob 240 which is keyed to the shaft 116 through a small angle as best seen in Fig. 19 so that a pointer 242 is rotated from the full line position to the dot dash position 242a. This is sufficient to rotate the cams far enough to remove the cam follower 107 from the recess 122 thereby closing the contacts 102 and 103 which completes the circuit through the motor thereby setting the motor 100 in motion. Also mounted on this shaft 116 and attached to the collar 236 is a rotating arm 244 which contacts with an arm 246 of a counting device 248 which indicates the number of pieces molded in the press.

Figure 5:
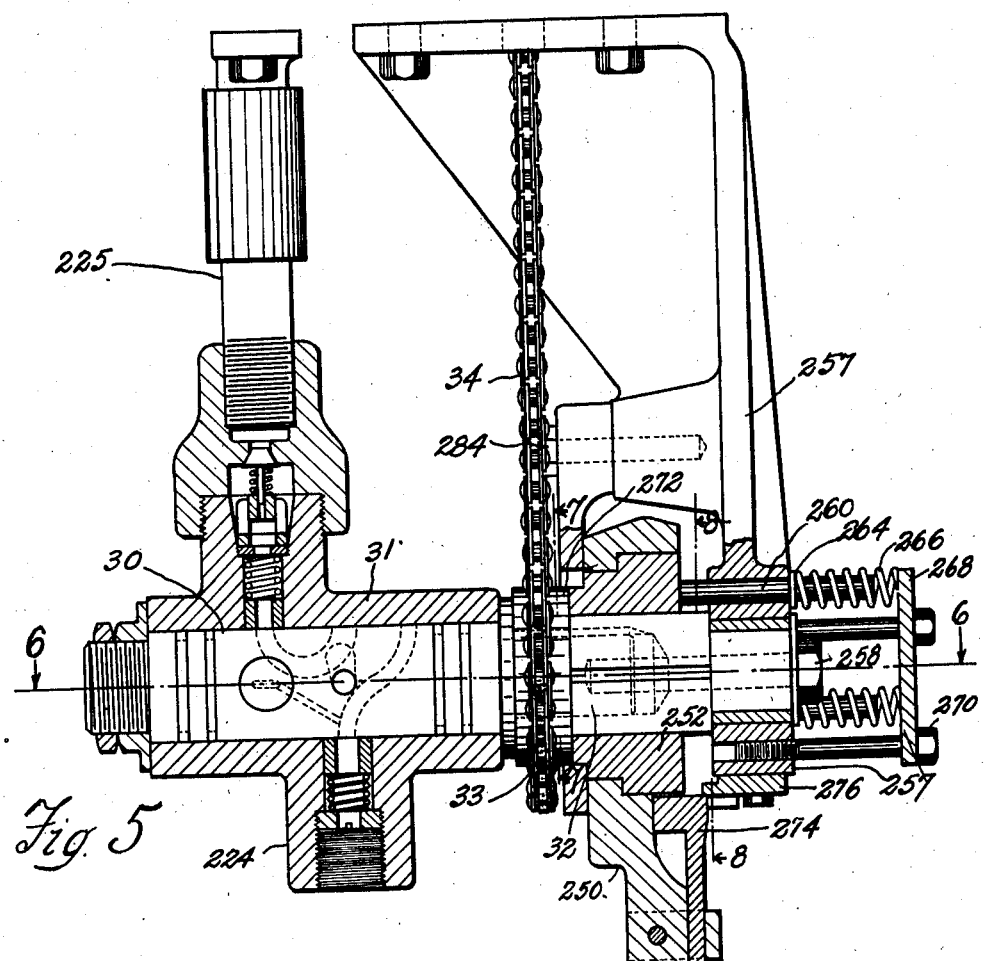
Fig. 5 is a sectional view of the valve mechanism taken substantially on the line 5—5 of Fig. 6.
Figure 6:
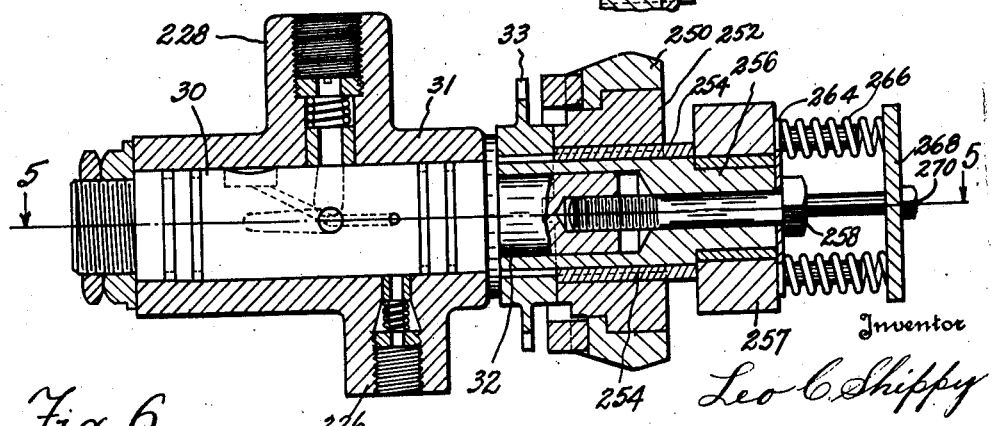
Fig. 6 is another sectional view of the valve mechanism taken on the line 6—6 of Fig. 5.
Figure 20:
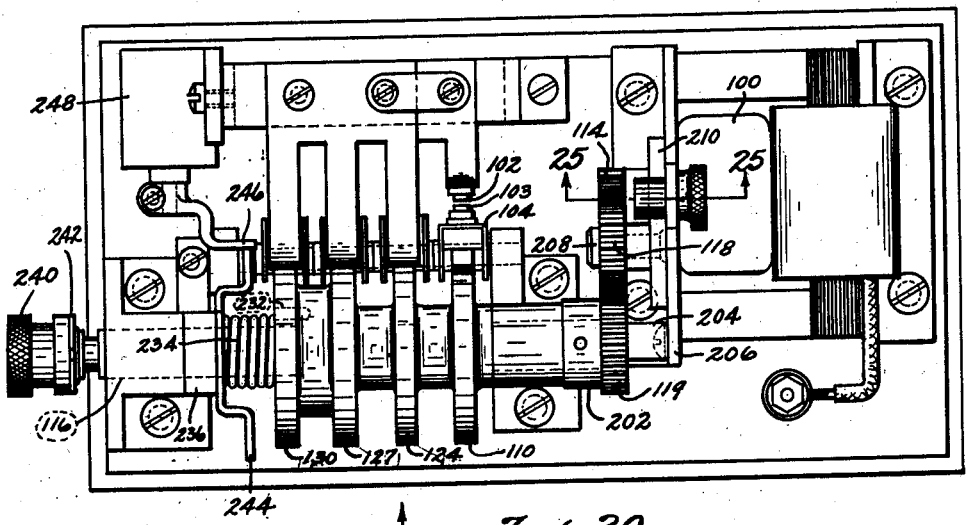
Fig. 20 is a plan view of the timing mechanism with the cover removed.
Figure 21:
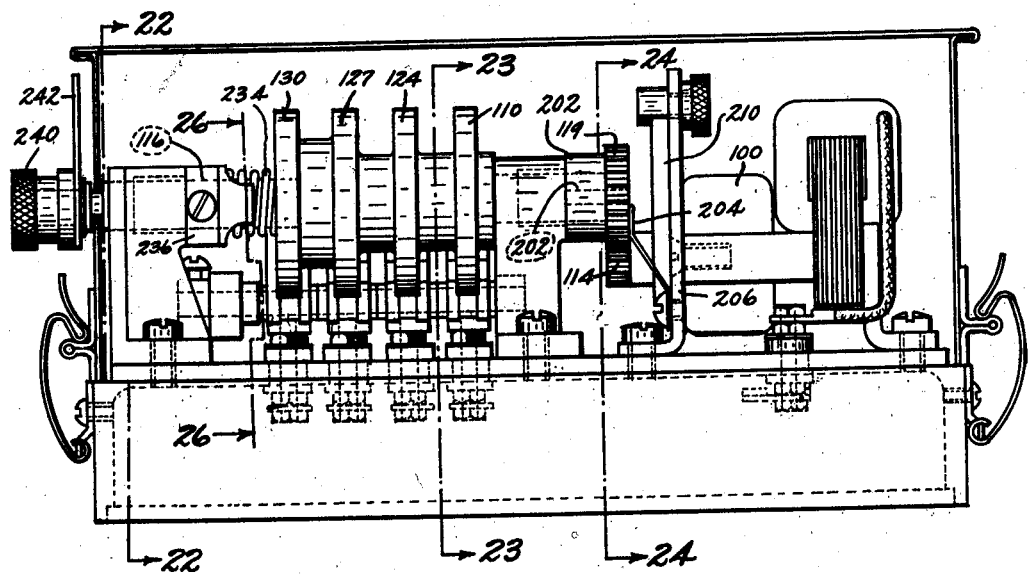
Fig. 21 is a side elevation taken in the direction of the arrow 21 of Fig. 20 of the timing mechanism with the cover in section.
Figures 22, 23:
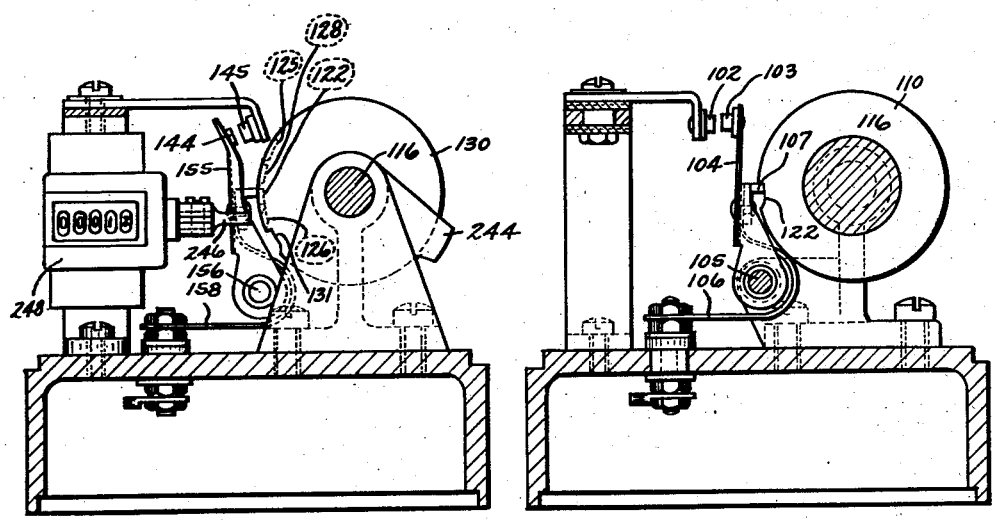
Fig. 22 is an end elevation taken on the line 22—22 of Fig. 21.
Fig. 23 is a sectional view taken on the line 23—23 of Fig. 21.
Figures 24, 25:
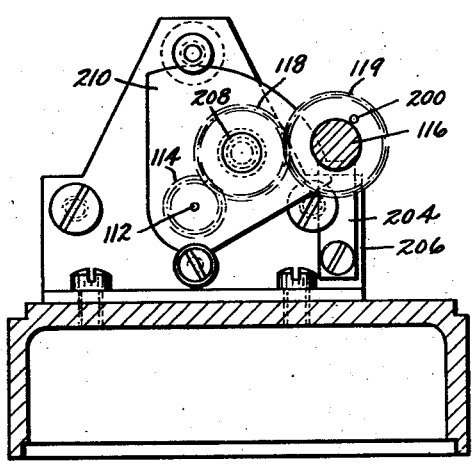
Fig. 24 is a sectional view taken on the line 24—24 of Fig. 21.
Fig. 25 is a fragmentary, sectional view taken on the line 25—25 of Fig. 20.

At times it may be desirable to use the molding press for a special job or a few special jobs which would not justify the adjusting of the timing mechanism but which may be done by the operator manually. In order to accomplish this, a lever 250 has been provided for the operator to use in operating the valve instead of the automatically controlled operating mechanism already described. The lever 250 is mounted on a collar 252 splined to a member 256 by keys 254. Member 256 is provided with a recess which fits over the end of the shaft 32 and held there by a screw 258 threadedly engaging the end of the shaft. The collar 252 and the lever 250 may move axially along the member 256. Normally the members 250 and 252 are biased to the left as viewed in Fig. 5 by a plurality of pins 260 each of which is provided with a collar 264 normally abutting a frame 257 which rotatively supports the member 256. The pins 260 are biased to the left as viewed in Figs. 5 and 6 by helical springs 266 mounted intermediate the collar 264 and a plate 268 held in position by a plurality of screws 270 engaging the frame 257. Whenever the collar 252 is biased to the left as viewed in Figs. 5 and 6, a plurality of detents 272 as seen in Fig. 7 engage recesses provided therefor on the sprocket wheel 33. Consequently the collar 252 will be rotated by the sprocket wheel 33 when in this position.

The lever 250 is normally held in an inoperative position by the pawl 274 resting on member 276 attached to member 257 by suitable screws. Whenever the operator desires to use the machine as a hand operated machine he releases member 274 from member 276 by the conventional lever release 278. Now as the operator manually rotates the lever 250 in a clockwise direction as seen in Fig. 2b the lever 250 will be cammingly engaged by a detent 280 integral with a member 282 attached to the frame 257 by suitable screws 284. The lever 250 will be biased to the right as viewed in Figs. 4, 5 and 6 by the inclined surface 286 of the detent 280 cooperating with an inclined surface 288 on a notch provided on lever 250 for receiving the detent. As the lever 250 is rotated the pawl 274 will engage a notch 290a in collar 252. As the lever 250 is moved to the right by the detent 280, collar 252 will also be moved to the right so as to allow the detents 272 integral with the collar 252 to clear the recesses provided therefor in the sprocket 33. As the handle 250 is rotated manually, the collar 252 and consequently the valve 30 will be rotated at the will of the operator without rotating the sprocket 33. As clearly seen in Fig. 8 if the lever is raised to the dot dash position 250a with the detent 274 released and then the detent 274 permitted to engage the notch 290a, it will rotate the valve 30a through a quarter turn when the lever is moved from 250a down to substantially position 250 where pawl 274 abuts the stop 276. This provides a means whereby the operator can rotate the valve 30 through an angle of 90° and no more. The operator raises the lever 250 to the up position and down four times in succession in order to rotate the valve 30 through one revolution.

From this it may be seen that the press may be automatically controlled to mold pieces of condensation products or from other suitable material without the aid of the operator during the process of molding or the operator may manually control each of the steps for special work. The machine is flexible in that the total length of time may be varied and in that the ratio of the time of application of one pressure to the time of application of another pressure may be varied to suit the needs of the particular work. Furthermore it may be seen that in the control mechanism all sliding electrical contacts have been eliminated and that all the cams are held in a relatively rigid position with respect to each other, which position may be changed at the will of the operator.

While the form of embodiment of the present invention as herein disclosed, constitutes a preferred form, it is to be understood that other forms might be adopted, all coming within the scope of the claims which follow.

What is claimed is as follows:

1. A device for controlling the pressure applied to a cylinder of a hydraulic press from a plurality of sources of different pressures comprising, in combination, a rotary valve for connecting a cylinder of the hydraulic press to each of the different pressures in a predetermined sequence; a motor for rotating the valve through a fraction of a revolution to connect the cylinder to one of said sources of pressure; an electrically controlled timer for automatically closing the motor circuit so as to cause the valve to be rotated after a predetermined time interval thereby changing the pressure applied to the hydraulic press and a snap switch for automatically opening the circuit after the valve has been rotated into position.

2. A device for controlling the pressure applied to a cylinder of a hydraulic press from a plurality of sources of different pressures comprising, in combination, a rotary valve for connecting the cylinder of the hydraulic press to each of the different pressures in a predetermined sequence; a motor for rotating the valve through a fraction of a revolution to connect the cylinder to one of said sources of pressure; an electrically controlled timer for automatically closing the motor circuit so as to cause the valve to be rotated after a predetermined time interval thereby changing the pressure applied to the hydraulic press, a snap switch for automatically opening the circuit after the valve has been rotated into position, and cam means for operating the snap switch.

3. A device for controlling the pressure applied to a cylinder of a hydraulic press from a plurality of sources of different pressures comprising, in combination, a rotary valve for connecting the cylinder of the hydraulic press to each of the different pressures in a predetermined sequence; a motor for rotating the valve through a fraction of a revolution to connect the cylinder to one of said sources of pressure; an electrically controlled timer for automatically closing the motor circuit so as to cause the valve to be rotated through a fraction of a revolution at the end of a predetermined time interval thereby changing the pressure applied to the hydraulic press; a snap switch for automatically opening the circuit after the valve has been rotated into position, cam means for actuating the snap switch, resilient means biasing the cam means; a reciprocating member for preventing the rotation of the cam means; and means for releasing the reciprocating member to permit the cam means to actuate the snap switch thereby opening the circuit.

4. A device for controlling the pressure applied to a cylinder of a hydraulic press from a plurality of sources of different pressures comprising, in combination, a rotary valve for connecting the cylinder of the hydraulic press to each of the different pressures in a predetermined sequence; a motor for rotating the valve through a fraction of a revolution to connect the cylinder to one of said sources of pressure; time controlled electrical means for automatically closing the motor circuit so as to cause the valve to be rotated at the end of a predetermined time interval thereby changing the pressure applied to the hydraulic press; a snap switch for automatically opening the circuit after the valve has been rotated into position; a cam; resilient means rotatably biasing the cam means; a reciprocating release for preventing the rotation of the cam means; and means for releasing the reciprocating release to permit the cam means to actuate the snap switch thereby opening the circuit; and a resiliently mounted buffer for absorbing the kinetic energy of the cam.

5. A device for controlling the pressure applied to a cylinder of a hydraulic press from a plurality of sources of different pressures comprising, in combination, a rotary valve for connecting the cylinder of the hydraulic press to each of the different pressures in a predetermined sequence; a motor for intermittently rotating the valve so as to connect the cylinder to each of said sources of pressure in sequence; an electrically controlled timer for automatically closing the motor circuit so as to cause the valve to be rotated at the end of a predetermined time interval, said timer including a plurality of pairs of contacts; and cam means for closing each pair of contacts to thereby close a circuit through the motor.

6. A device for controlling the pressure applied to a cylinder of a hydraulic press from a plurality of sources of different pressures comprising, in combination, a rotary valve for connecting the cylinder of the hydraulic press to each of the different pressures in a predetermined sequence; a motor for rotating the valve through a fraction of a revolution to connect the cylinder to one of said sources of pressure; time controlled electrical means for automatically closing the motor circuit so as to cause the valve to be rotated at the end of a predetermined time interval so as to cause the valve to connect another source of pressure to the cylinder, said time controlled means including a plurality of contacts, each contact upon being closed completing a circuit through the motor thereby actuating the valve to connect a predetermined pressure to the cylinder; and means for closing each of said contacts in sequence.

7. A device for controlling the pressure applied to a cylinder of a hydraulic press from a plurality of sources of different pressures comprising, in combination, a rotary valve for connecting the cylinder of the hydraulic press to each of the different pressures in a predetermined sequence; a motor for intermittently rotating the valve through a fraction of a revolution to connect the cylinder to each of said sources of pressure in sequence; time controlled electrical means for automatically closing the motor circuits so as to cause the valve to be rotated at the end of a predetermined time interval, said time controlled means including a plurality of pairs of contacts; cam means causing some of the pairs of contacts to close in sequence thereby periodically closing each a motor circuit and cam means permitting one pair of contacts to open to thereby open all of said circuits.

8. A device for controlling the pressure applied to a cylinder of a hydraulic press from a plurality of sources of pressure, comprising, in combination, a rotary valve for connecting the cylinder to each of the different pressures in a predetermined sequence; a motor for rotating the valve through a fraction of a revolution to connect the cylinder to one of said sources of pressure; a plurality of circuits for the motor; a pair of contacts in each of the circuits; and cam means for closing each of the contacts in a predetermined sequence to thereby intermittently energize the motor so as to cause the valve to be actuated intermittently.

9. A device for controlling the pressure applied to a cylinder of a hydraulic press from a plurality of sources of different pressures, comprising, in combination, a rotary valve for connecting the cylinder to each of the different pressures in a predetermined sequence; a motor for rotating the valve through a fraction of a revolution to connect the cylinder to one of said sources of pressure; and an electrically controlled timer for automatically closing the motor circuit so as to cause the valve to be rotated at the end of a predetermined time interval, said electrically controlled timer including a plurality of circuits for said electric motor; a pair of contacts in each of the circuits; cam means for opening said contacts, and resilient means for closing the contacts, one of said cams being adustably mounted relative to the other cams so as to permit a change in the relative time interval.

10. A device for controlling the pressure applied to a cylinder of a hydraulic press from a plurality of sources of different pressures, comprising in combination, a rotary valve for connecting the cylinder to each of the different pressures in a predetermined sequence; a motor for rotating the valve through a fraction of a revolution to connect the cylinder to one of said sources of pressure; and an electrically controlled timer for automatically closing the motor circuit so as to cause the valve to be rotated at the end of a predetermined time interval, said electrically controlled timer including a plurality of circuits for said electric motor; a pair of contacts in each of the circuits; cam means for opening said contacts; resilient means for closing the contacts, one of said cams being adustably mounted relative to the other cams so as to permit a change in the time interval; and manually operated means for starting the electrically controlled timer at the beginning of each series of cycles of operations.

11. A device for controlling the pressure applied to a cylinder of a hydraulic press from a plurality of sources of different pressures comprising, in combination, a rotary valve for connecting the cylinder of the hydraulic press to each of the different pressures in a predetermined sequence; a motor for rotating the valve to connect the cylinder to one of said sources of pressure; means for automatically closing the motor circuit after a predetermined interval of time; and means for opening the motor circuit when the valve has been rotated into position.

12. A device for controlling the pressure applied to a cylinder of a hydraulic press from a plurality of sources of different pressures comprising, in combination, a rotary valve for connecting the cylinder of the hydraulic press to each of the different pressures in a predetermined sequence; an electric motor for rotating the valve so as to connect the cylinder to one of said sources of pressure; and time responsive means for controlling the motor circuit.

13. A device for controlling the pressure applied to a cylinder of a hydraulic press from a plurality of sources of different pressures; comprising in combination, intermittently operated means for connecting the cylinder to each of said sources in a predetermined sequence; a motor for actuating said means; an electrically controlled timer for automatically closing the motor circuit after a predetermined time interval so as to cause said means to connect the cylinder to one of said sources of pressure; and means for opening the motor circuit when the cylinder has been connected to said source of pressure.

14. A device for controlling the pressure applied to the cylinder of a hydraulic press from a plurality of sources of different pressures, comprising in combination, means intermittently operated for connecting the cylinder to each of said sources of pressure in a predetermined sequence; driving means for actuating said first means; an electric motor for driving said driving means; a timer for automatically closing the motor circuit after a predetermined interval of time; and means controlled by said driving means for opening the motor circuit when the cylinder has been connected to said source of pressure.

15. A device for controlling the pressure applied to the cylinder of a hydraulic press from a plurality of sources of different pressures, comprising in combination, a rotary valve for connecting the cylinder to each of the different pressures in a predetermined sequence; driving means for rotating said valve, said driving means including an electric motor; time controlled means for closing the motor circuit so as to cause the valve to be rotated to thereby change the pressure applied to the cylinder; and means controlled by said driving means for opening the motor circuit when the pressure applied to the cylinder has been changed.

In testimony whereof I hereto affix my signature.

LEO C. SHIPPY.